United States Patent [19]

Huber

[11] 4,282,766

[45] Aug. 11, 1981

[54] ADJUSTING MECHANISM FOR REGULATING DEVICES

[75] Inventor: Rudolf Huber, Vienna, Austria

[73] Assignee: Hoerbiger Ventilwerke Aktiengesellschaft, Vienna, Austria

[21] Appl. No.: 60,727

[22] Filed: Jul. 25, 1979

[30] Foreign Application Priority Data

Jul. 25, 1978 [AT] Austria .................................. 5413/78

[51] Int. Cl.³ ........................ F16H 1/20; F16K 31/12
[52] U.S. Cl. ............................. 74/424.8 VA; 137/315; 137/505.42; 403/353; 267/175
[58] Field of Search ........................ 403/353; 251/266; 137/315, 505.42; 74/424.8 VA; 267/175, 177

[56] References Cited

U.S. PATENT DOCUMENTS

| | | | |
|---|---|---|---|
| 1,694,051 | 12/1928 | Bardon | 403/353 |
| 2,241,747 | 5/1941 | Shaw | 403/353 |
| 2,361,881 | 10/1944 | Sheppard | 267/175 |
| 3,542,408 | 11/1970 | Lowery | 403/353 |
| 3,621,867 | 11/1971 | Johnson | 137/505.42 X |
| 4,121,495 | 10/1978 | Maloefal | 403/353 |
| 4,212,560 | 7/1980 | Pufpaff et al. | 403/353 |

*Primary Examiner*—A. Michael Chambers
*Attorney, Agent, or Firm*—Watson, Cole, Grindle & Watson

[57] ABSTRACT

An adjusting mechanism for a regulating device comprises a housing which has an end wall that includes a keyshaped slot, a spring collar which is movably mounted in the housing to effect the adjustment in the regulating device, an elongated spindle which is connected at its lower end portion to the spring collar and extends through the slot in the housing end wall, and a handwheel connected to the upper end portion of the spindle located outside the housing. The elongated spindle includes a collar portion along its length and the key-shaped slot is configured to allow the lower end portion and collar portion to fit through the wider portion of the slot but be retained by the narrower portion.

6 Claims, 2 Drawing Figures

4,282,766

ADJUSTING MECHANISM FOR REGULATING DEVICES

BACKGROUND OF THE INVENTION

This invention relates to an adjusting mechanism for a regulating device, in particular to an adjusting mechanism for a reducing valve.

Adjusting mechanisms are used in particular in pressure-reducing valves to adjust the force exerted by a spring on a piston acted upon by the pressure to be regulated, or on a diaphragm. Essentially two types of construction are known. In one construction, an adjusting spindle screws into a housing enclosing the spring, and acts on one end of the spring through a spring collar. In the other type of construction, the handwheel does not itself participate in the adjustment motion. In this instance, the spindle is supported rotatably but immovably in the axial direction within the housing and cooperates with a nut arranged in the housing and which is displaceable, but not rotatable.

The known construction with a rising handwheel requires a fairly large amount of space, while the other type is appreciably more difficult to fabricate and to assemble. The spindle has to be fitted from within the housing, and the dimensions of the end which is to receive the handwheel must be smaller than those of the seating collar. The profile for the nonrotational connection with the handwheel must therefore be fashioned afterwards, on the external end of the spindle.

It is the object of the present invention to improve the known adjusting mechanisms such as to facilitate fabrication of the adjusting spindle and insertion thereof into the housing.

SUMMARY OF THE INVENTION

According to the invention, there is provided an adjusting mechanism for a regulating device, the mechanism comprising a handwheel-operated adjusting spindle seated by means of a spindle collar in a rotatable, axially immovable manner against a transversely extending wall of a housing, the wall having a keyhole-shaped slot therein, the larger area portion of which is large enough for the spindle to pass through, and the handwheel being mountable on the inserted spindle and being centered relative to the housing, to maintain the spindle in the correct position against the transverse wall.

With this construction, the spindle can have uniform external dimensions over its entire length, but it may also be thicker at its external end, since it does not now have to be inserted from the inside.

In a preferred embodiment of the invention, there is provided on the spindle, between the spindle collar and the end intended to receive the handwheel, an annular slot with which the seating wall engages. With this annular slot, the spindle can be inserted from the side directly into the slot-shaped opening of the seating wall, where it is secured against axial displacement in either direction.

Mounting of the spindle is further facilitated if the open-sided slot is continued as far as the side-wall of the housing.

The invention will now be better understood by reference to the attached drawing taken in conjunction with the following discussion.

DETAILED DESCRIPTION OF THE PREFERRED EMBODIMENT

Figure 1:
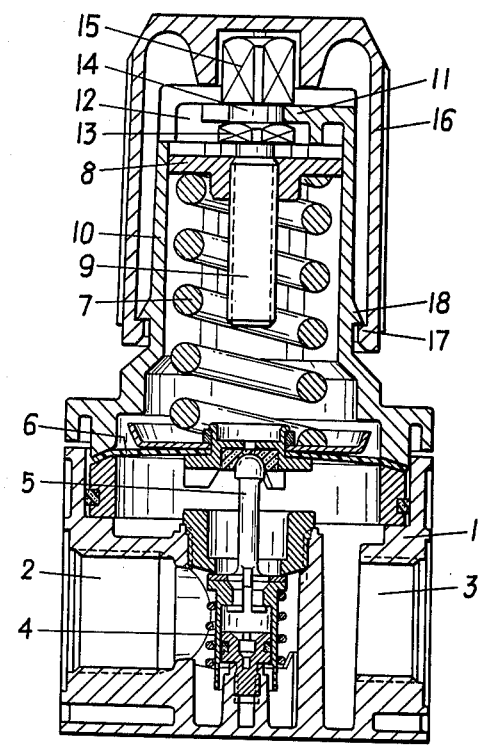
FIG. 1 shows an axial cross sectional view through a regulating device which includes an adjusting mechanism constructed in accordance with the present invention.

As shown in FIG. 1, the regulating device to which the inventive adjusting mechanism is connected is in the form of a pressure-reducing valve comprising a valve housing 1 having an inlet 2, with an outlet 3 and a regulating valve 4 interposed between the inlet and the outlet. The closure member of the regulating valve 4 is actuated through a stem 5 by diaphragm 6. Diaphragm 6 is loaded by the inventive adjusting mechanism, which includes a regulating spring 7 seated in a spring collar 8. This spring collar is in the form of a nut and is arranged on a threaded adjusting spindle 9, so that as the spindle is turned, the nut is displaceable in the axial direction of the spindle. The spindle 9 and the spring collar 8 are enclosed in a spring housing 10 which is placed on the valve housing 1 and simultaneously clamps the diaphragm 6 in position.

Figure 2:
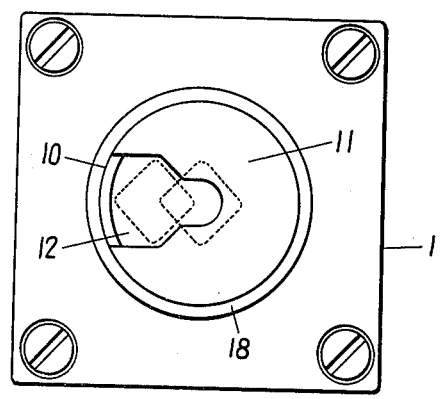
FIG. 2 shows a top plan view of the regulating device housing with the handwheel and spindle removed.

The adjusting spindle 9 is seated against a transversely extending wall 11 of the spring housing 10. As can be seen in particular in FIG. 2, the wall 11 is provided for this purpose with an opening in the form of an open-sided slot 12. The shape of the slot 12 is similar to that of a keyhole, i.e., it has a larger area portion and a narrow portion. The adjusting spindle 9 is inserted into the slot 12. The spindle has a collar 13 which may be squareheaded as shown in the example, and which abuts against the seating wall 11 from within. Above collar 13, there is an annular groove 14 with which the seating wall 11 engages. On the external end of the adjusting spindle 9 there is located a square-headed crown 15, on which a handwheel 16 is placed. The handwheel 16 is bell-shaped and the skirt thereof encloses a cylindrical portion of the spring housing 10. The skirt of the handwheel 16 which can for example be formed of plastic, is provided in the region of its outer edge with a hook-shaped profile 17 which registers behind a ridge 18 on the spring housing 10 to secure the handwheel in position.

As can be seen from the drawing, the adjusting spindle 9 can be inserted into the spring housing 10 from outside the housing through the slot 12. This insertion is carried out eccentrically, somewhat to one side of the central axis of the spring housing. The inserted spindle is then pushed so that its annular groove 14 is located in the narrow part of the slot 12. The spring collar 8 is then screwed into position from below. The handwheel 16, mounted last, centers the adjusting spindle 9 relative to the spring housing 10 and prevents its disengagement from the open-sided slot 12.

I claim:

1. An adjusting mechanism for a regulating device, said mechanism including
    an elongated housing which has an end wall including a key slot therethrough that is shaped to have a larger portion and a smaller portion, the smaller portion being positioned so as to be in alignment with the axis of said housing, a spring collar which is slidingly mounted in said housing to be movable towards and away from said end wall, said spring collar having a threaded hole therethrough which is in alignment with the axis of said housing, a regulating spring mounted in said housing, one end of said regulating spring abutting said spring collar and the opposite end being in contact with a movable part of said regulating device, movement of said spring collar away from said end wall causing said regulating spring to be compressed against said movable part of said regulating device, an adjusting spindle which is shaped to have an elongated threaded lower portion, a collar portion and an upper portion, said collar portion having larger radial dimensions than the smaller portion of said key slot whereas said upper portion includes at least a section which has smaller radial dimensions than said smaller portion of said key slot, said elongated threaded lower portion and said collar portion of said spindle being movable through the larger portion of said key slot in said end wall and repositionable such that said threaded lower portion will threadingly engage the axial threaded hole in said spring collar and such that said section of said upper portion of said spindle will fit within said smaller portion of said key slot, the collar portion of said spindle preventing said spindle from thereafter being removed through said smaller portion of said key slot, rotation of said spindle moving said spring collar along said housing and thus adjusting the pressure of said regulating spring against said movable part of said regulating device.

2. The regulating mechanism of claim 1, including a handwheel connected to the upper portion of said spindle so as to maintain said spindle aligned along the axis of said housing.

3. The regulating mechanism of claim 2, wherein said handwheel is bell-shaped, the skirt portion thereof surrounding at least a portion of said housing.

4. The regulating mechanism of claim 1, wherein said housing is cylindrical and wherein said larger portion of said key slot extends to the cylindrical side wall of said housing.

5. The regulating mechanism of claim 1, wherein said upper portion of said spindle includes a crown having a square cross section.

6. The regulating mechanism of claim 5, wherein said crown has larger radial dimensions than the smaller portion of said key slot.

* * * * *